United States Patent
Klesing

(10) Patent No.: US 6,633,148 B1
(45) Date of Patent: Oct. 14, 2003

(54) DRIVE DEVICE AND METHOD FOR MOVING A VEHICLE PART

(75) Inventor: Joachim Klesing, München (DE)

(73) Assignee: Webasto Dachsysteme GmbH, Stockdorf (DE)

(*) Notice: Subject to any disclaimer, the term of this patent is extended or adjusted under 35 U.S.C. 154(b) by 0 days.

(21) Appl. No.: 09/786,393

(22) PCT Filed: Sep. 3, 1999

(86) PCT No.: PCT/EP99/06509

§ 371 (c)(1),
(2), (4) Date: Jun. 20, 2001

(87) PCT Pub. No.: WO00/14844

PCT Pub. Date: Mar. 16, 2000

(30) Foreign Application Priority Data

Sep. 3, 1998 (DE) .......................... 198 40 162

(51) Int. Cl.$^7$ .............................. H02P 3/00; H02P 7/00
(52) U.S. Cl. .................. 318/445; 318/174; 318/280; 318/283; 318/432; 318/434; 318/445; 318/466; 318/467; 318/470; 701/49
(58) Field of Search .................. 318/280, 283, 318/445, 466, 467, 470, 174, 432, 434; 701/49; 49/26

(56) References Cited

U.S. PATENT DOCUMENTS

| 5,483,133 A | * | 1/1996 | Takabe et al. .............. 318/466 |
| 5,786,675 A | * | 7/1998 | Niki et al. .................. 318/466 |
| 6,070,116 A | * | 5/2000 | Pruessel et al. ............. 701/49 |
| 6,086,177 A | * | 7/2000 | Driendl et al. .............. 318/466 |

FOREIGN PATENT DOCUMENTS

| DE | 29 26 938 | | 1/1981 | |
| DE | 0592927 | * | 5/1993 | ............ H02H/7/85 |
| DE | 43 12 865 | | 11/1993 | |
| DE | 43 21 264 | | 1/1994 | |
| DE | 42 34 501 | | 4/1994 | |
| DE | 195 11 581 | | 10/1995 | |
| DE | 196 18 219 | | 11/1997 | |
| EP | 0 592 927 | | 4/1994 | |
| WO | WO 92/20891 | * | 11/1992 | |

* cited by examiner

*Primary Examiner*—Robert E. Nappi
*Assistant Examiner*—Tyrone Smith
(74) *Attorney, Agent, or Firm*—Nixon Peabody LLP; David S. Safran

(57) ABSTRACT

The invention relates to a process for adjusting a motor vehicle part between at least two positions, the motor vehicle part being driven by an electric motor, pulse signals being generated according to the rotary motion of the electric motor and being supplied to a control unit for controlling the electric motor, in the first computation (50) with a first parameter set the first value for the instantaneous force acting on the motor vehicle part is determined from the acquired pulse signals at certain first instants. Parallel to the first computation, in at least the second computation (52) with a second parameter set which differs from the first parameter set the second value for the instantaneous force acting on the motor vehicle part is determined from the acquired pulse signals at certain second instants, the two values being considered for the instantaneous action of the force in order to decide whether the electric motor is turned off or reversed or not. Furthermore the invention relates to a corresponding device for executing this process.

12 Claims, 4 Drawing Sheets

DRIVE DEVICE AND METHOD FOR MOVING A VEHICLE PART

BACKGROUND OF THE INVENTION

1. Field of the Invention

The invention relates to a process for adjusting a motor vehicle part between at least two positions and a drive device for a motor vehicle part which can be adjusted between at least two positions.

2. Description of Related Art

Published German Patent Application DE 43 21 264 A1 discloses a generic process and a generic drive device. Here, an electric motor drives a motor vehicle window pane. By means of two Hall sensors which are offset by 90 degrees and which interact with a magnet located on the motor shaft, a signal is produced from which the instantaneous period duration of a motor revolution and thus the instantaneous motor rpm are determined at each time at which one such signal enters a control unit for controlling the motor. As soon as the instantaneous rpm change resulting from the difference of two successive rpm measured values exceeds a stipulated threshold value, the motor is reversed in order to release a possibly pinched article.

Published German Patent Application DE 195 11 581 A1 discloses a similar drive device in which, however, the threshold value is variably chosen depending on the position, a memory for certain positions of the adjustment path storing the speed change acquired in an earlier run between two adjacent positions, in order to compute therefrom as a function of position depending on the last currently acquired position and speed the shut-off threshold for the speed.

Published German Patent Application DE-OS 29 26 938 discloses acquiring the motor rpm in a sliding roof drive at uniform time intervals, finding the differences of successive values, adding these differences to one another when they are larger than a predetermined threshold value, and triggering the shut-off or reversal of the motor as soon as the added sum exceeds a predetermined threshold value.

Published German Patent Application DE 43 12 865 A1 discloses a drive device for a motor vehicle window which acquires the motor rpm by means of two Hall detectors, and which reverses the motor when a threshold is exceeded for the relative change of rpm. In doing so, the threshold value is continually recomputed depending on the acquired motor voltage and the ambient temperature which is determined by a temperature sensor on the motor. In doing so, the status/operating times of the motor are considered in order to be able to draw conclusions about the ambient temperature from the motor temperature.

Published German Patent Application DE 196 18 219 A1 and its corresponding U.S. Pat. No. 6,070,116, disclose determining the rpm threshold or the rpm change threshold of the motor, starting from which reversal of the motor takes place, from the position-dependent rpm data of a reference run which has taken place beforehand depending on the position of the cover for a sliding roof drive. More specifically, to prevent faulty actuation of motor reversal or stoppage, a calculated value is produced from a set of measured values and is compared with two limit values, and only when both limit values are exceeded, is the motor stopped or reversed.

Published European Patent Application EP 0 592 927 A1 and German Patent DE 42 34 501 C2 disclose a control for a building door, both the intensity being evaluated by an electric motor which drives the door and the rpm of the electric motor being evaluated in two parallel evaluation paths in order to detect a case of pinching, this taking place by means of a logic circuit for the two paths. In this way, provisions are made for redundancy for the failure of one of the two evaluation paths, in order, in this case as well, to still achieve reliable pinching protection.

International Patent Application Publication WO 92/20891 discloses pinching protection for moving motor vehicle parts, for example, windows or sliding roofs, the motor current being acquired, and in the first evaluation channel, the instantaneous motor current being compared to a peak current which has been acquired by a peak detector, and in the second evaluation channel, the current measurement signal being routed through filters connected in parallel with different time constants, the two filter outputs being compared to one another in a comparator. The two comparator outputs are used in a monitoring circuit as the input signal; in the first mode, a case of pinching being detected according to the signal of the first comparator, and in the second mode, a case of pinching being detected according to the signal of the second comparator. There are two parallel evaluation channels to detect pinching of a soft or a hard obstacle.

The defect in these generic drive devices which acquire the rpm is that they can be optimized, for example, by the choice of the trigger threshold only for one pinching speed, i.e., one stiffness of the entire system. The stiffness of the entire system is composed of the stiffnesses of the drive mechanism, of the pinched body, and of the motor vehicle body. On the one hand, the stiffness of the pinched body depends on the type of body. On the other hand, the stiffness of the vehicle body depends largely on the location at which the body is pinched. Thus, the stiffness can vary from one case of pinching to another, by which, in the known systems, only a small portion of the pinching cases can be optimally recognized.

SUMMARY OF THE INVENTION

The object of this invention is to devise a drive device for a motor vehicle part which can be moved between at least two positions and a process for adjusting a movable motor vehicle part between at least two positions, by which more reliable acquisition of pinching of an article is acquired.

This object is achieved in accordance with the present invention by a process and by a drive device as described in detail below.

In accordance with the invention, it is advantageous that acquisition by the pinching protection system can be optimized for at least two different pinching scenarios.

In one advantageous development of the invention, it is determined whether the first value determined in a first computation for the action of a force exceeds a given first trigger threshold or whether the second value determined from a second computation for the action of a force exceeds a given second trigger threshold, the results of the two comparisons being combined in an OR operation. This represents an especially simple acquisition of pinching.

Preferably, the first computation and the second computation are optimized for recognition of the fastest or slowest changes of the action of the force which can be expected. This forms reliable pinching acquisition in a range of pinching scenarios as wide as possible.

Preferably, in the second computation, a new value of the action of the force is computed only after each n-th input of a pulse signal (i.e., a set number of pulse signal inputs), while in the first computation, the instant of input of each pulse signal on the control unit is acquired, and between two such input instants, at certain extrapolation instants from at least some of these measured instants, the first value for the current force acting on the motor vehicle part is determined. This enables acquisition both of very fast and also very slow pinching processes.

Two embodiments of the invention are explained in detail below using the attached drawings.

DETAILED DESCRIPTION OF THE INVENTION

Figure 1:
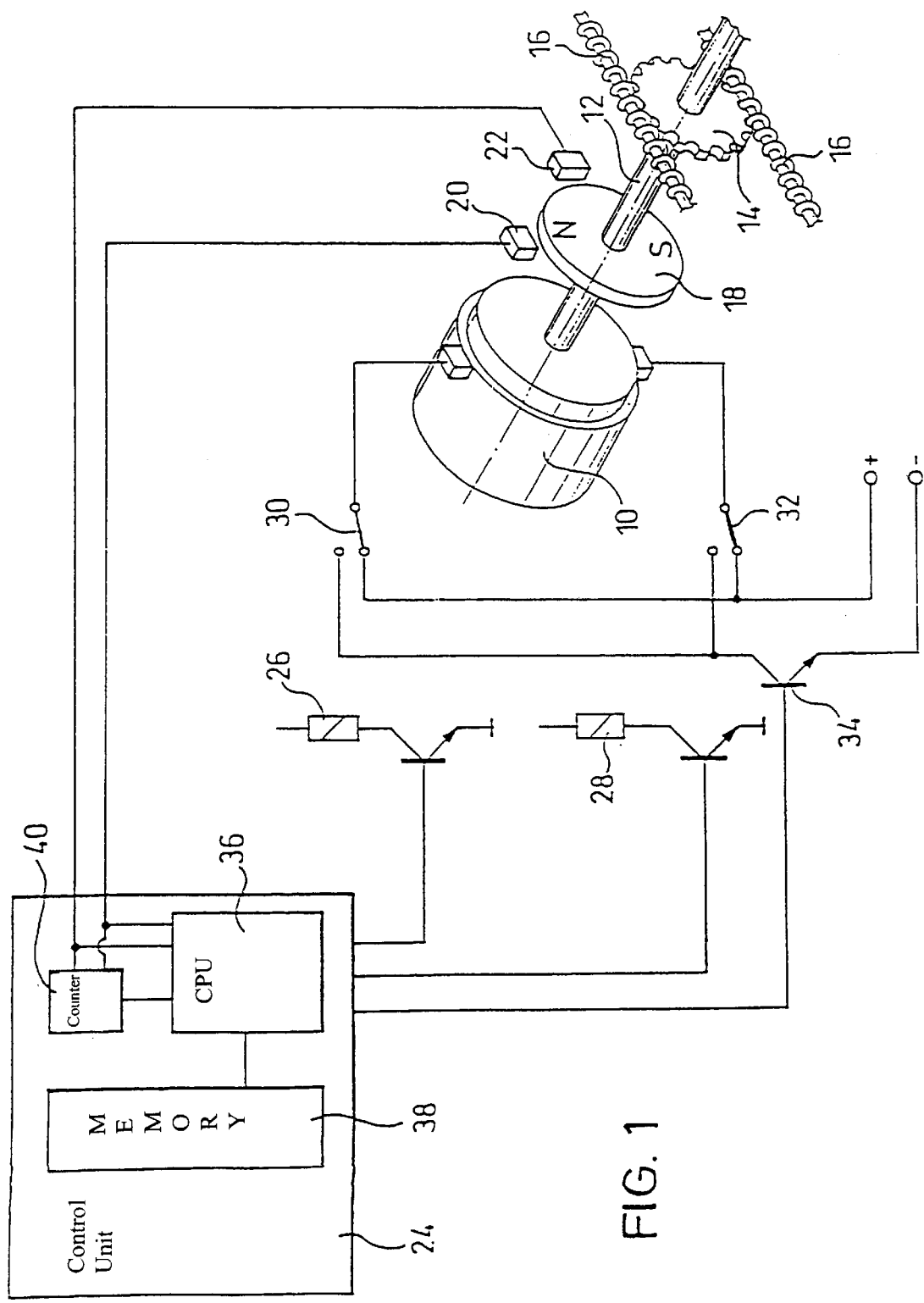
FIG. 1 shows a schematic of a drive device in accordance with the invention.
Figure 4:
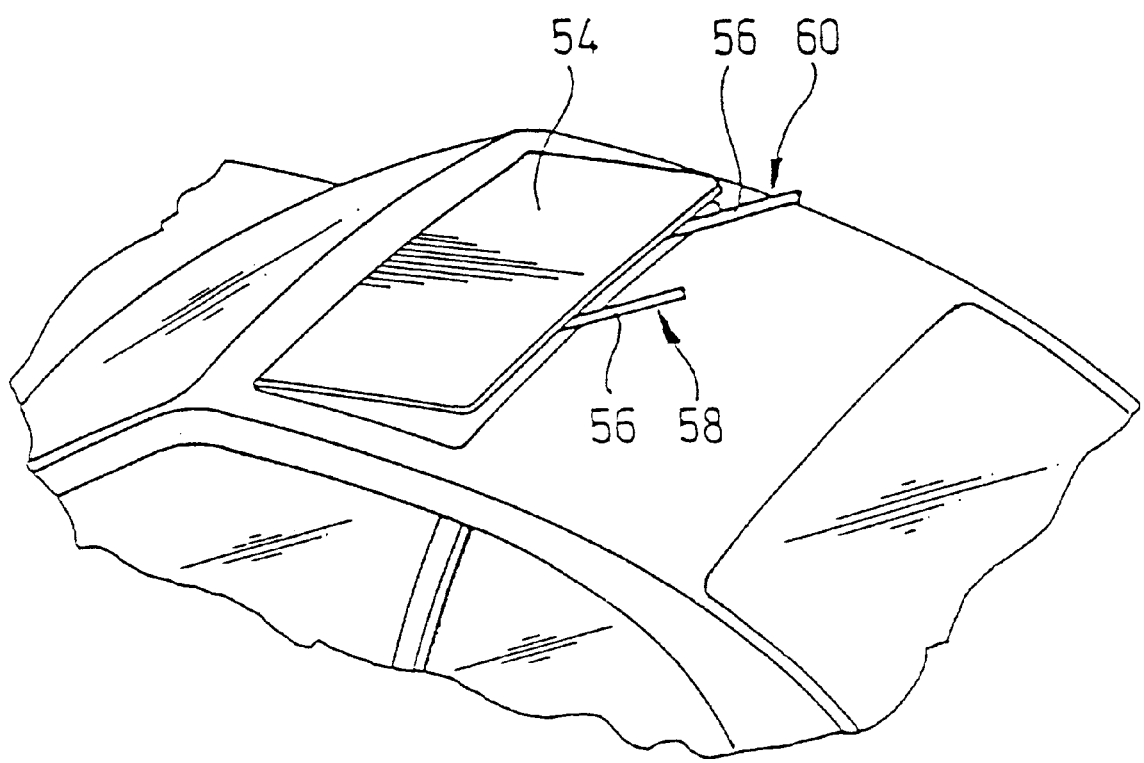

With reference to FIG. 1, an electric motor 10 which is made as a DC motor drives via a shaft 12 a pinion 14 which engages two drive cables 16 which are guided to be resistant to tension and compression. Between the electric motor 10 and the pinion 14, there is optionally another worm gear pair which is not shown. The movable covers 54 of the sliding motor vehicle roofs, currently mostly made as sliding and lifting roofs or spoiler roofs, are generally driven by means of these drive cables 16. The window raisers of a motor vehicle door often act via a cable drum and a smooth cable on the movable part, i.e., the window. It is irrelevant for the following examination how the force is applied to the movable motor vehicle part. Preferably, the cover 54 of a sliding and lifting roof which, however, for the sake of better clarity is only shown in FIG. 4 is driven.

A magnet wheel 18 with at least one south pole and one north pole is mounted on the shaft 12 so as to rotate therewith. Of course, there can also be several, for example, four north poles and four south poles, on the magnet wheel 18, by which the period duration of the signals is shortened accordingly. In the peripheral direction offset by roughly 90 degrees, near the magnet wheel 18, there are two Hall sensors 20, 22 each of which deliver a pulse signal for each passage of the north and south pole of the magnet wheel 18 to a control unit 24 which is provided with a microprocessor 36 and a memory 38 and which thus receives a signal for roughly each quarter revolution of the shaft 12. The period duration results from the interval of two successive signals on the same sensor 20 and 22 which are part of the interval of one complete revolution of the shaft 12. Due to the 90 degree arrangement of the two sensors 20, 22, the period duration is computed alternately from the time difference of the last two signals on the sensor 20 and 22 so that, for each quarter revolution, a new value of the period duration is available. By this type of determining the period duration, deviations from the exact 90 degree geometry of the sensor arrangement have no effect on the period duration, as would be the case when the period duration is determined from the time difference between the last signal of one sensor and of the other sensor.

As a result of the phase shift of the signals of the two sensors 20, 22, the direction of rotation can also be determined. In addition, the current position of the cover 54 can be determined from the signals of the Hall sensors 20, 22 by these signals being supplied to a counter 40 which is assigned to the control unit 24.

The direction of rotation of the electric motor 10 can be controlled by the control unit 24 via two relays 26, 28 with reversing contacts 30, 32. The rpm of the motor 10 are controlled by pulse width modulation via a transistor 34 which is triggered by the control unit 24.

From the instant of signal input from the Hall sensors 20 and 22, the microprocessor 36 determines the instantaneous period duration of the revolution of the shaft 12, and thus, of the electric motor 10. Thus, roughly for each quarter turn of the shaft 12, a measured value for the period duration is available. To ensure pinching protection between these instants as well, estimated values for the period duration are continuously extrapolated in a fixed time reference, for example, after each 1 ms, from preceding measured values of the period duration, for example, according to the following formula $$T^*[k]=T[i]+k\ (a1\ T[i-1]+a2\ T[i-2]+a3\ T[i-3]) \quad (1)$$

a1, a2, a3 being parameters, i being an index which for each signal input, i.e., for each quarter period, is incremented, and k being the running index of the fixed time reference which is reset to zero for each new measured value for the period duration. Instead of the last four measured values, depending on the requirement, also more or fewer measured values can be considered, for example, only the last two.

Figure 2:
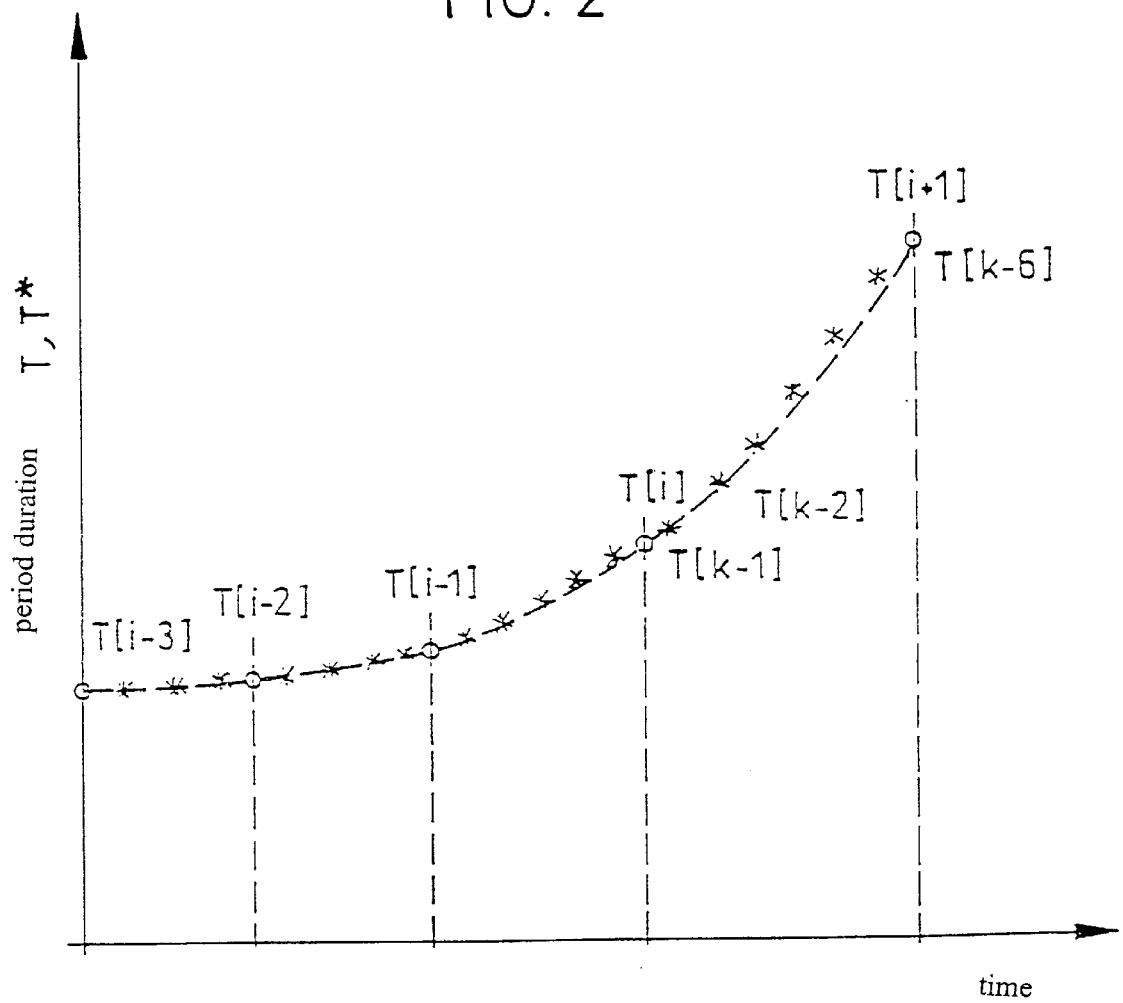
FIG. 2 shows a graphic representation of a sample time behavior of the period duration of a motor revolution.

The parameters a1, a2, a3 model the entire system of the drive device, i.e., the motor 10, the force transmission components and the cover, and are determined by the spring stiffnesses, damping and friction of the entire system. This yields bandpass action with the property that spectral portions of the period time behavior caused by vibrations are evaluated more weakly than those originating from a case of pinching. FIG. 2 schematically shows the sample time behavior of the measured period durations T and the period durations T* which have been estimated therefrom. The broken-line curve represents the true behavior of the period duration.

From the estimated values for the period duration which have been determined in this way, then the rpm change at time [k] relative to the preceding instant [k−1] is estimated, a motor voltage filter and a path profile filter being used to eliminate the effects of the motor voltage and the position at which the movable motor vehicle part, i.e., the cover, is in fact located, on the motor rpm, the following formula being used:

$$\Delta N^*[k]=(T^*[k]-T^*[k-1])/\ (T^*[k])^2-Vu(Um[k])-Vr(x[k]) \quad (2)$$

Um[k] being the motor voltage at time [k], Vu being the motor voltage filter which simulates the relationship between the rpm and the motor voltage which has been acquired by the control unit 24, x[k] being the position of the cover at time [k] and Vr being a path profile filter which simulates the relationship between the motor rpm and the position of the cover.

The motor voltage filter Vu simulates the dynamic behavior of the motor for voltage changes. Preferably the motor voltage filter Vu is made as a lowpass filter with a time constant which is equal to the motor time constant. The time constant is dependent on the operating case, i.e., on the opening or closing of the cover 54 in the sliding or lowering direction, and on the magnitude of the voltage change.

The path profile filter Vr is automatically determined by a learning run after the drive device is installed. The position of the cover 54 is, as mentioned above, determined from the pulse signals of the Hall sensors 20, 22 which are added up by means of the counter 40.

The decision whether a case of pinching is present or not is made using the following formula:

$$\Sigma(Vf \cdot \Delta N^*[k]) = \Sigma(\Delta F[k]) > Fmax \quad (3)$$

The estimated rpm changes $\Delta N^*[k]$ are compared to a fixed, time-constant lower boundary. As soon as they exceed this lower boundary, they are each multiplied by a proportionality factor Vf which reproduces the steepness of the motor characteristic of the electric motor 10 (torque over rpm). At a constant motor voltage and motor temperature, the steepness is roughly constant, but for each electric motor 10 it is individually different. To eliminate these effects, on the one hand, a temperature sensor acquires the ambient temperature and the motor temperature is approached via the acquisition of the operating duration (instead the ambient temperature can also be directly acquired by a temperature sensor on the electric motor 10). On the other hand, for each electric motor 10, before connection to the cover 54 within the framework of the final production check, at a constant motor voltage, two pairs of values for rpm and torque are determined and stored in a memory 38. From these measured values, the rise of the motor characteristic is determined, from which the proportionality factor Vf is computed.

The product of $\Delta N^*[k]$ and Vf corresponds to the change $\Delta F[k]$ of the force acting on the displacement motion of the cover 54 at time [k] relative to the instant [k−1].

The values of $\Delta F[k]$ are added up as long as the values of $\Delta N^*[k]$ are above the fixed lower boundary. As soon as two successive $\Delta^*[k]$ values are again below it, the sum is set to zero. If the $\Delta N^*[k]$ value exceeds a fixed upper boundary, in place of this $\Delta N^*[k]$ only the value of the upper boundary is included in the sum. This is used to eliminate as much as possible the effects of vibrations which lead to brief periodic peaks of the rpm change on the recognition of a case of pinching. This upper boundary can be chosen to be constant in the simplest case. In order to increase the accuracy of triggering, however, the upper limit can also be chosen differently in time depending on the currently determined rpm change, for example, in the form that the upper limit is raised as the current rpm change rises.

As soon as the sum of $\Delta F[k]$ exceeds a maximum allowable pinching force Fmax, the control unit 24 by triggering the relays 26, 28 via the switches 30, 32 initiates reversal of the electric motor 10 in order to again immediately release the pinched article or the pinched body part.

Thus, the pinching protection is also active due to the described extrapolation of the period durations between the two measured values of the period duration at fixed instants, by which a case of pinching can be recognized earlier, i.e., at a lower pinching force; this better prevents damage or injuries and thus increases the safety of the drive device.

To further reduce the probability of faulty activation when vibrational forces occur, spectral analysis of the rpm changes determined within a certain time window up to the analysis instant can be undertaken. When certain spectral characteristics occur, especially when a clearly pronounced peak occurs which is not in the spectral range typical for cases of pinching, triggering is prevented even if the threshold Fmax is exceeded.

Figure 3:
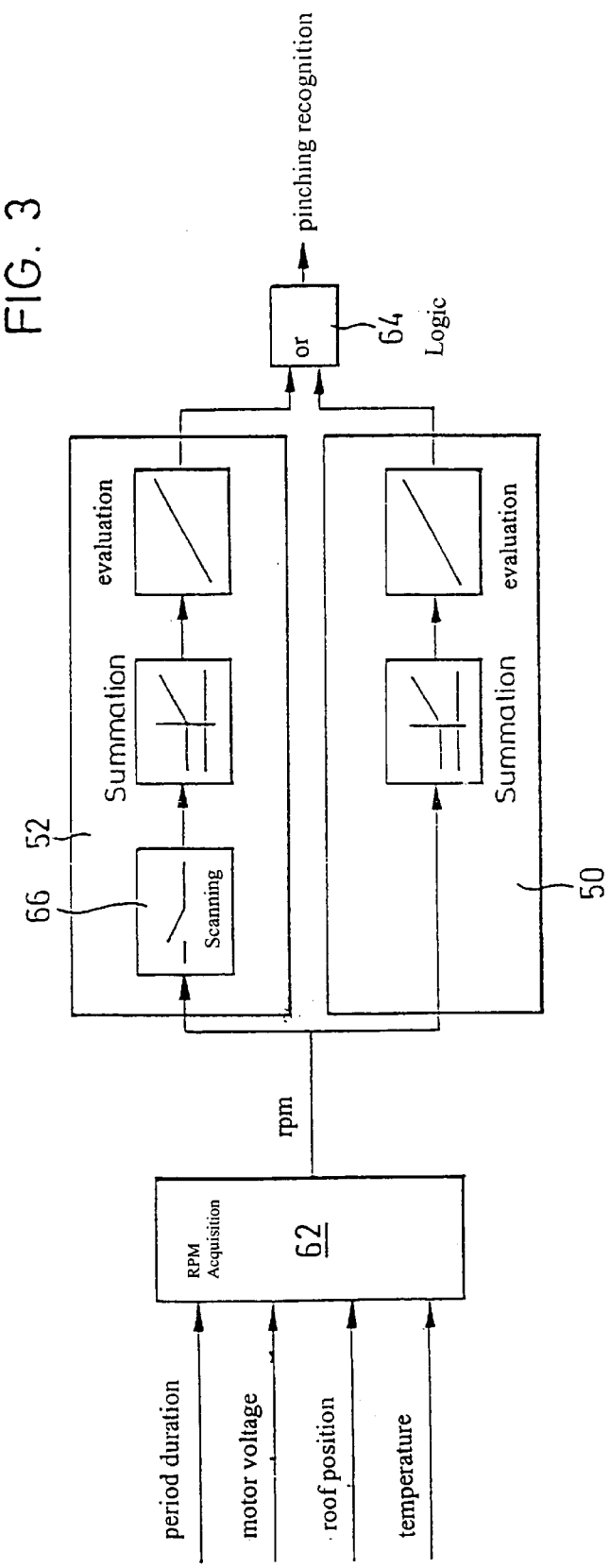
FIG. 3 shows a schematic of one embodiment of the process in accordance with the invention for determining a case of pinching, and FIG. 4 schematically shows a motor vehicle roof for illustration of the process as shown in FIG. 3.

FIG. 3 schematically shows a second embodiment of the invention. The major difference from the above described first embodiment is that parallel and independently of the extrapolation of the measured period durations in accordance with the invention at certain times and of the determination of estimated values for the force acting on the adjustable motor vehicle part in a first computation 50, a second computation 52 is carried out with its own set of parameters and with a different scanning rate which likewise delivers the value for the instantaneous action of the force. For the decision whether the motor is to be turned off or reversed, the results of the two computations are considered in a logic stage 64 in the form of an OR operation. This results from the following considerations:

The stiffness of the entire system is composed of the stiffnesses of the sliding and lifting roof mechanism, of the pinched body, and of the motor vehicle body. On the one hand, the stiffness of the pinched body depends on the type of body. On the other hand, the stiffness of the vehicle body depends largely on the location at which the body is pinched. This applies especially in the lowering motion of the cover 54 from a raised position, see FIG. 4. If in doing so a body 56 is pinched in the area of the middle of the roof (indicated in FIG. 4 at 58), the entire system, based on the possible deflection of the rear edge of the cover, is much softer than for pinching in the edge area (indicated in FIG. 4 at 60).

The scanning rate is hereinafter defined as the interval of the instants at which the value for the instantaneous action of the force is determined. If the system is working with a single fixed scanning rate, the set of parameters of the computation, especially the threshold values or the boundary values, and the selected scanning rate can be optimized only for a single stiffness of the entire system, but in practice, depending on the type and location of the pinched body, different stiffnesses of the entire system can be decisive.

By carrying out a second parallel computation 52, it is possible to optimize this second computation 52 for another stiffness by the corresponding choice of the computation parameters and the scanning rate underlying the computation, i.e., the choice of the instants at which a new value of the instantaneous action of force is computed.

The second computation 52 is preferably optimized for acquisition of slow changes of the action of force, i.e., small stiffnesses, while the first computation 50 is optimized for the acquisition of fast changes of the action of force, i.e., high stiffnesses.

Generally, in the secondary computation 52, it is not necessary to extrapolate the measured values of the period duration, but depending on the relevant stiffness range, in any case after input of a new measured value or only after each n-th input of the measured value, the computation 52 of the new value of the instantaneous action of force is performed. But basically, if necessary, the second computation 52 can use an extrapolation algorithm, the extrapolation instants being chosen at a greater interval than in the first computation 50.

As shown in FIG. 3, in the rpm acquisition stage 62, from the input values period duration T, motor voltage, cover position x and motor temperature according to the aforementioned formulas (1) and (2) with the first (higher) scanning rate, i.e., at the measurement instants [i] and the extrapolation instants [k], the current rpm change $\Delta N^*$ or the current rpm $N^*$ is determined (this results from $N^*[k]=1/T^*[k]-Vu(Um[k])-Vr(x[k]$; instead of [k], there can also be [i]). Furthermore, when determining the rpm in the conversion from the change in rpm to the change in force, the motor temperature is taken into account according to equation (3). The first scanning rate is chosen such that it is optimum for acquisition of cases of pinching with the highest system stiffnesses to be expected. The rpm acquisition stage 62 is used jointly by the first computation 50 and the second computation 52.

In the first computation 50, it is ascertained from the rpm change ΔN* by means of the formula (3) in the aforementioned manner using the first value for the fixed lower boundary, the first value for the fixed upper boundary, and the first value for the threshold value Fmax at the instants which have been established by the first scanning rate, i.e. the extrapolation instants [k], whether the instantaneous action of the force exceeds this first threshold value Fmax. The values of this first parameter set are optimized for the acquisition of cases of pinching with the largest system stiffness to be expected.

In the second computation 52, the scanning rate is chosen such that it is optimum for acquisition of cases of pinching with the lowest system stiffnesses to be expected. This second scanning rate can be chosen, for example, such that only each fourth measured value of the period duration T is considered. In this case, the second computation is performed only for each fourth signal input from the Hall sensors 20, 22, i.e., only each fourth rpm N[i] which is determined by the stage 62 and which goes back to the measured period duration T, is considered in the scanning stage indicated at 66 in FIG. 3. The rpm N*[k] which have been determined from the extrapolated period durations T* are, of course, ignored anyway. The second computation 52 is therefore carried out only at each fourth instant [i].

First, the change of rpm ΔN[i] is determined relative to the last measured value. Then, analogously, by means of the equation (3), using a second value for the fixed lower boundary, a second value for the fixed upper boundary, and a second value for the threshold value Fmax is established, whether the instantaneous action of force exceeds this second threshold value Fmax. The values of this second parameter set are optimized for acquisition of cases of pinching with the smallest system stiffness to be expected.

For the decision whether there is a case of pinching, i.e., the motor is to be turned off or reversed, the results of the first and the second computation are logically combined with one another in the logic stage 64. In the simplest case, it is an OR operation. In this case, therefore, the motor is turned off or reversed when one of the two computations has acquired a case of pinching. The decision is made at each instant at which the first computation 50 delivers a new result. Since new results of the second computation 52 are present much more rarely, the last result of the second computation 52 is supplied to the logic stage 64.

Both fast and soft changes of the action of the forces can be optimally acquired by the combination of the results of the two computations 52, 54.

What is claimed is:

1. Process of using a rotary electric motor to displace a motor vehicle part between at least two positions, comprising the steps of:
    generating pulse signals according to rotary motion of the electric motor and supplying said pulse signals to a control unit for controlling the electric motor,
    performing a first computation with a first parameter set, which is optimized for determination of a first pinching scenario, and via which a first value of instantaneous force acting on the motor vehicle part is determined from the pulse signals acquired at certain first instants defining a first scanning rate,
    parallel to the first computation, performing at least a second computation with a second parameter set, which differs from the first parameter set and which is optimized for determination of a second pinching scenario, and via which a second value for the instantaneous force acting on the motor vehicle part is determined from the pulse signals acquired at certain second instants defining a second scanning rate different from said first scanning rate,
    using the computed first and second values for the instantaneous action of the force to determine whether the electric motor is to be turned off or reversed, or is to continue to run.

2. Process as claimed in claim 1, comprising the further step of determining whether the first value determined in the first computation for the action of the force exceeds a given first trigger threshold and whether the second value determined from the second computation for the action of the force exceeds a given second trigger threshold.

3. Process as claimed in claim 2, comprising the further step of combining the results of comparing the values determined with the respective threshold are combined in an OR operation of a logic stage.

4. Process as claimed in claim 1, comprising the further step of optimizing the first computation and the second computation for recognition of the fastest or slowest changes of the action of the force which can be expected.

5. Process as claimed in claim 4, wherein the first instants have an interval that is smaller than the intervals of the second instants.

6. Process as claimed in claim 5, wherein a new value of the action of the force is computed in the second computation less frequently than after each input of a pulse signal.

7. Process as claimed in claim 4, wherein the instant of input of each pulse signal on the control unit is acquired in the first computation, and wherein the first value for the current force acting on the motor vehicle part is determined between two such input instants at certain extrapolation instants from at least some of these measured instants.

8. Process as claimed in claim 7, wherein the instantaneous period duration of the motor revolution is determined from the measured instants in the first computation, wherein the instantaneous period duration is determined with consideration of several previous measured period durations at the extrapolation instants, wherein the estimated rpm change is determined from the estimated period durations for each extrapolation instant and the first value of the force acting on the motor vehicle part is determined from the estimated changes of rpm at each extrapolation instant.

9. Process as claimed in claim 2, wherein the electric motor is turned off or reversed whenever either of said first and second values exceeds the respective trigger threshold.

10. Drive device for a motor vehicle part which can be moved between at least two positions, comprising:
    a rotary electric motor for driving the motor vehicle part;
    a control unit for controlling the electric motor; and
    means for producing a pulse signal according to the rotation of the motor supplying the pulse signal to the control unit;
    wherein the control unit is adapted to perform a first computation determining a first value for the instantaneous force acting on the motor vehicle part with a first parameter set, which is optimized for determination of a first pinching scenario, from pulse signals acquired by the control unit at certain first instants defining a first scanning rate,
    wherein the control unit is adapted to perform, parallel to the first computation, at least a second computation determining a second value for the instantaneous force acting on the motor vehicle part with a second parameter set, which is optimized for determination of a second pinching scenario, from pulse signals acquired by the control unit at certain second instants defining a second scanning rate different from said first scanning rate, and wherein means are provided for using the computed first and second values for the instantaneous action of the force to determine whether the electric motor is to be turned off or reversed, or is to continue to run.

11. Drive device as claimed in claim 10, wherein the control unit is adapted to execute a process wherein it is determined whether the first value determined in the first computation for the action of the force exceeds a given first trigger threshold and whether the second value determined from the second computation for the action of the force exceeds a given second trigger threshold.

12. Drive device as claimed in claim 11, wherein the control unit is adapted to determine that the electric motor is to be turned off or reversed whenever either of said first and second values exceeds the respective trigger threshold.

* * * * *